United States Patent
Hanes

(10) Patent No.: US 8,972,628 B2
(45) Date of Patent: Mar. 3, 2015

(54) EXPANDABLE WIRELESS STORAGE DEVICE FOR STREAMING A MULTI-MEDIA FILE

(71) Applicant: Hewlett-Packard Development Company, L.P., Houston, TX (US)

(72) Inventor: David H. Hanes, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 128 days.

(21) Appl. No.: 13/740,058

(22) Filed: Jan. 11, 2013

(65) Prior Publication Data

US 2014/0201397 A1 Jul. 17, 2014

(51) Int. Cl.
G06F 13/14 (2006.01)
G06F 3/01 (2006.01)

(52) U.S. Cl.
CPC .................................. *G06F 13/14* (2013.01)
USPC ............................................ 710/52; 710/33

(58) Field of Classification Search
CPC ............. G06F 3/01; G06F 3/00; G06F 13/14; G06F 13/00
USPC ...................................................... 710/52, 33
See application file for complete search history.

(56) References Cited

U.S. PATENT DOCUMENTS

| | | | | |
|---|---|---|---|---|
| 4,612,613 | A * | 9/1986 | Gershenson et al. | 710/74 |
| 5,696,991 | A * | 12/1997 | Chang | 710/52 |
| 6,816,929 | B2 * | 11/2004 | Ueda | 710/56 |
| 7,966,288 | B2 | 6/2011 | Hahn et al. | |
| 8,176,230 | B2 | 5/2012 | Chen et al. | |
| 8,234,423 | B2 * | 7/2012 | Liu et al. | 710/52 |
| 2002/0120797 | A1 * | 8/2002 | Fabre | 710/60 |
| 2003/0163620 | A1 * | 8/2003 | Minami et al. | 710/62 |
| 2005/0015260 | A1 * | 1/2005 | Hung et al. | 704/500 |
| 2006/0201310 | A1 * | 9/2006 | Takashima et al. | 84/600 |
| 2007/0028046 | A1 | 2/2007 | Pham | |
| 2007/0254588 | A1 * | 11/2007 | Lafuente | 455/41.2 |
| 2008/0229016 | A1 * | 9/2008 | Waites | 711/115 |
| 2011/0289283 | A1 | 11/2011 | Baptist et al. | |
| 2012/0221679 | A1 * | 8/2012 | Yamamoto et al. | 709/217 |
| 2013/0027314 | A1 * | 1/2013 | Masaki et al. | 345/168 |

OTHER PUBLICATIONS

Wi-Drive, Oct. 2011, www.kingston.com/us/usb/wireless/#wid.

* cited by examiner

*Primary Examiner* — Christopher Shin
(74) *Attorney, Agent, or Firm* — Hewlett-Packard Patent Department

(57) ABSTRACT

An expandable wireless storage device is provided that includes an interface slot, internal memory, a wireless interface and an aggregated file system view providing component. An external memory, which stores a first subset of multi-media files, can be physically coupled with the expandable wireless storage device using the interface slot. A second subset of multi-media files can be stored on the internal memory. A multi-media file of the multi-media files can be streamed to a playing device using the wireless interface. The internal memory is used as a buffer when the multi-media file resides on the external memory. An aggregated file system view providing component provides an aggregated file system view of the multi-media files.

13 Claims, 4 Drawing Sheets

EXPANDABLE WIRELESS STORAGE DEVICE FOR STREAMING A MULTI-MEDIA FILE

BACKGROUND

Mobile devices, such as smart phones, personal digital assistants (PDAs), and tablets, have become very popular. Frequently these mobile devices have their own operating systems. These mobile devices may store data and perform various functions, such as enabling a user to enter data into a mobile device, edit data on the mobile device, make phone calls from a mobile device, receive data that was transmitted to a mobile device, and transmit data from a mobile device to another electronic device. Due to their convenience, many people are interested in using their mobile devices for an ever expanding array of activities.

BRIEF DESCRIPTION OF THE DRAWINGS

The accompanying drawings, which are incorporated in and form a part of this Description of Examples, illustrate various examples of the present disclosure and, together with the description, serve to explain principles discussed below: The Figures are not drawn to scale unless specified.

DETAILED DESCRIPTION EXAMPLE

According to various embodiments, a storage device is provided with expandable memory (also referred to as an "expandable storage device"). For example, a person may buy a storage device with no internal memory or with a certain amount of internal memory and expand its memory at a later point in time by physically coupling an external memory to the storage device. The expandable storage device can be used for storing multi-media files such as videos, music, or photos, or a combination thereof.

Multi-media files can be stored on or associated with the expandable storage device in a number of ways. For example, a user can connect the expandable storage device to another electronic device using a wireless or a physical connection to download one or more multi-media files to either the internal memory or the external memory. In another example, an external memory, which already has one or more multi-media files stored on it, can be physically coupled with the expandable storage device.

According to one embodiment, the expandable storage device can wirelessly stream a multi-media file to a playing device that can present the multi-media file to a user. For example, a multi-media file can be streamed from either internal memory or external memory associated with the storage device to a playing device wirelessly.

According to one embodiment, the storage device is mobile. For example, the user can take the storage device any where with them in their house, in their car on road trips or within a hotel room. They can use their expandable storage device to stream a multi-media file to a playing device within their house, in their car, or in a hotel room, among other places. The storage device can enable different users to experience the same multi-media file or different multi-media files. Further, the different users can experience a multi-media file at the same time or at different points in time.

A user can organize theft multi-media files by storing different types of multi-media files (also referred to herein as "content") on different external memories. For example, one external memory may store music, another external memory may store videos, a third external memory may store one television (TV) series and a fourth external memory may store another TV series. The user can gain access to the type of content they are currently interested in by coupling the external memory with that type of content with the storage device.

Figure 1:
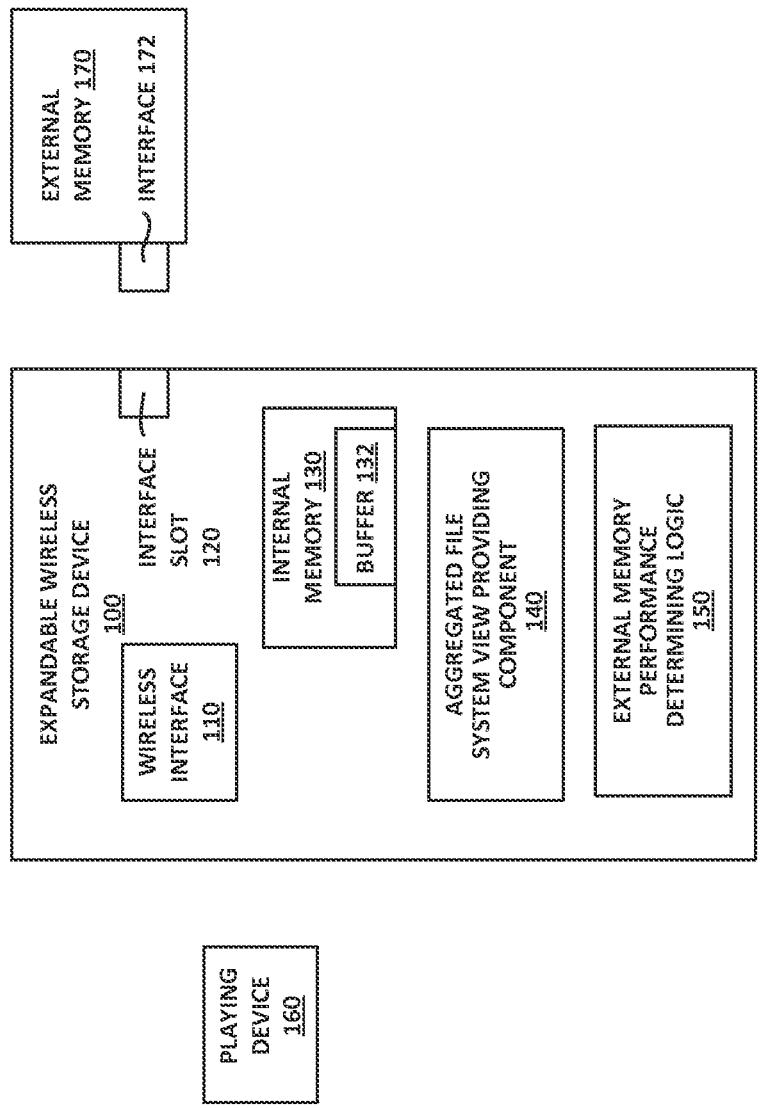
FIG. 1 depicts a block diagram of an expandable wireless storage device, according to one embodiment.

FIG. 1 depicts a block diagram of an expandable wireless storage device, according to one embodiment.

FIG. 1 depicts an expandable wireless storage device 100, a playing device 160 and an external memory 170. The storage device 100 includes internal memory 130, an interface slot 120, and a wireless interface 110. The internal memory 130 can include a buffer 132. The storage device 100 may also optionally include an aggregated file system view providing component 140 or an external memory performance determining logic 150, or a combination thereof.

The playing device 160 may be a standard or legacy playing device. Examples of playing devices 160 are tablets, smart phones, personal computers, and set-top boxes, televisions, personal computers, or any type of electronic device that is capable of playing a multi-media file to a user. According to one embodiment, the storage device 100 is mobile. According to one embodiment, the storage device 100 uses an open streaming standard, such as Universal plug and play (UPnP) or Digital Living Network Alliance (DLNA). The storage device 100 may be battery-powered.

Examples of an interface slot 120 are a universal serial bus (USB) port, a secure digital (SD) card slot, or a micro-SD card slot. Flash memory can be used to implement the internal memory 130 or the buffer 132, or a combination there of. Examples of an external memory 170 are an SD, micro-SD card, USB flash drives, compact flash, and secure digital high capacity (SDHC).

The storage device 100 is expandable. For example, the external memory 170 can be physically coupled with the storage device 100 to provide the storage device 100 with additional memory.

The storage device 100 can store multi-media files. Examples of multi-media files are videos, music, digital recordings and photos. A multi-media file can be audio, visual, or a combination thereof. The storage device 100 can store multi-media files on either the internal memory 130 or the external memory 170 or a combination thereof. For example, a first subset of the multi-media files may be stored on the external memory 170 and a second subset of the multi-media files may be stored on the internal memory 130. According to one embodiment, each of the multi-media files is stored on either the external memory 170 or the internal memory 130. According to one embodiment, the first subset and the second subset differ with respect to each other by at least one multi-media file. According to one embodiment, the two subsets are mutually exclusive so that each multi-media file is stored on only one of the memories 130 or 170. For example, there may be only one copy of each multi-media file that is stored on either the internal memory 130 or the external memory 170, according to one embodiment.

The interface slot 120 can be used for physically coupling the expandable wireless storage device 100 with external memory 170, for example, by plugging an interface 172 of the external memory 170 into the storage device 100's interface slot 120.

The storage device 100 can be used for streaming one or more of the multi-media files that are stored on either the internal memory 130 or the external memory 170 to a playing device 160. For example, the storage device 100's wireless interface 110 can be used for streaming a multi-media file to the playing device 160. In another example, the storage device 100's wireless interlace 110 can simultaneously stream more than one multi-media file, for example, to a plurality of playing devices. The wireless interface 110, according to one embodiment, enables streaming within an area of approximately 7 to 25 meters. However, various embodiments are well suited to areas that are larger or smaller than 7 to 25 meters.

According to one embodiment, the internal memory 130 provides higher performance than the external memory 170. For example, the data transmission rate that the internal memory 130 is capable of providing may be higher than the data transmission rate that the external memory 170 is capable of providing. Therefore, according to one embodiment, if the multi-media file is stored on the external memory 170, at least a portion of the internal memory 130 can be used as a buffer 132 to increase the transmission rate from the external memory 170 to the playing device 160 to prevent problems in the presentation of the multi-media to the user when played on the playing device 160.

According to one embodiment, the aggregated file system view providing component 140 can provide an aggregated file system view of the first subset and the second subset of the multi-media files. The aggregated file system view is a presentation of the multi-media files that reside on the internal memory 130 and the external memory 170 to the user as if both subsets of the multi-media files resided on the same memory. For example, all of the multi-media files regardless of where they reside will appear to the user as if they reside on the same memory, according to one embodiment. According to one embodiment, the user is prevented from using the aggregated file system view to determine which memory 130, 170 any of the multi-media files resides on According to one embodiment, the internal memory 130 can be used by the aggregated file system view providing component 140 to store, for example by caching, the file system structures and metadata, such as file names, file dates, or time information, associated with the multi-media files.

According to one embodiment, the internal memory 130 is large enough to store a relatively large number of multi-media files as well as providing a buffer 132 for streaming multi-media files stored on the external memory 170. According to another embodiment, the internal memory 130 is relatively small. In one example of a relatively small internal memory 130, the internal memory 130 may provide a buffer 132 for streaming multi-media files stored on the external memory 170 and store a relatively small number of multi-media files. In another example, the internal memory 130 may be used only as a buffer 132 for streaming multi-media files stored on the external memory 170.

According to one embodiment, the storage device 100 may include external memory performance determining logic 150 for determining the performance of the external memory 170. For example, when the external memory 170 is physically coupled to the storage device 100 using the respective interface slot 120 and interface 172, the storage device 100 can read data from the external memory 170 and calculate the external memory 170's bandwidth. If the external memory 170's performance is adequate, the storage device 100 can stream a multi-media file from the external memory 170 to the playing device 160 without buffering the multi-media file in the internal buffer 132. Thus, according to one embodiment, the storage device 100 is not required to have internal memory 130 of its own. However, the storage device 100 may have internal memory 130 even if it is not required, according to one embodiment.

If the external memory 170's performance is inadequate, the storage device 100 can take one or more actions. For example, the storage device 100 can use the internal buffer 132 as a part of streaming a multi-media file from the external memory 170 to the playing device 160 to increase the data transmission rate. Further, the storage device 100 may prefetch a multi-media file from the external memory 170 and store it in the internal buffer 132 in preparation for streaming the multi-media file. In yet another example, if the performance is below a certain threshold that would prevent the external memory 170 from providing adequate transmission rates, the storage device 100 can generate an error message that can be displayed, for example, on the storage device 100 or the playing device 160.

Figure 2:
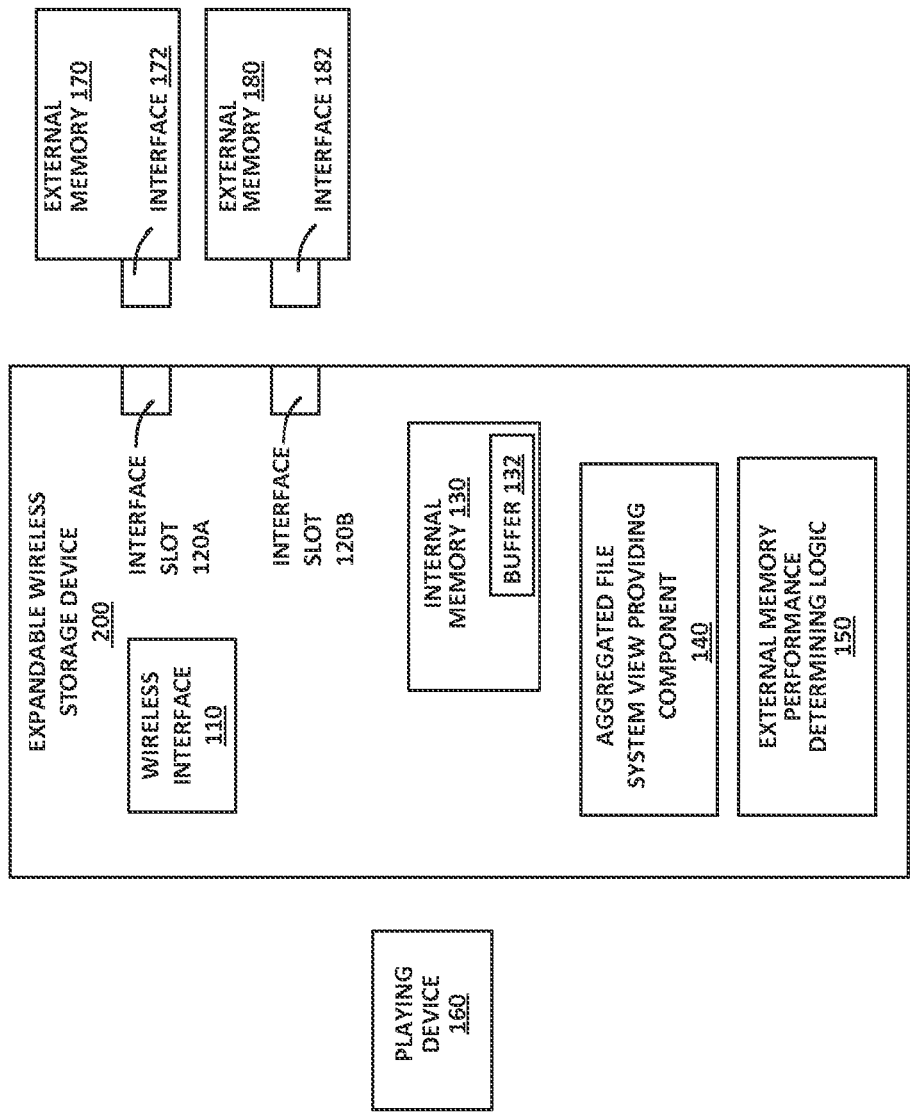
FIG. 2 depicts a block diagram of an expandable wireless storage device with a plurality of interface slots, according to another embodiment.

FIG. 2 depicts a block diagram of an expandable wireless storage device 200 with a plurality of interface slots 120A, 120B, according to another embodiment. As depicted in FIG. 2, the expandable wireless storage device 200 has two interface slots 120A, 120B and, therefore, can be physically coupled with two external memories 170, 180. For example, respective interface slots 120A, 120B can be used to physically couple the storage device 200 with the respective interfaces 172, 182 of the respective external memories 170, 180. Various embodiments are well suited to one or more interface slots of physically coupling one or more external memories with a storage device.

According to one embodiment, the aggregated file system view providing component 140 can provide an aggregated file system view of all of the multi-media files regardless of where they reside so that the multi-media files appear to the user as if they reside on the same memory, according to one embodiment. For example, according to one embodiment, all of the multi-media files on the internal memory 130, the first external memory 170 and an optional second external memory 180 are presented as an aggregated file system view so that the user is not aware of whether they reside on the internal memory 130, the first external memory 170 or the optional second external memory 180.

According to one embodiment, an expandable wireless storage device may have two internal memories. For example, an expandable wireless storage device may have a relatively small fast internal memory that is used as a buffer and a relatively large slower internal memory that is used for storing multi-media files. The buffer can be used for streaming a multi-media file that resides on external storage that is physically coupled to the mobile wireless device or a multi-media file that resides on the relatively large slower internal memory. According to one embodiment, an aggregated file system view can be provided for all of the multi-media files regardless of where they reside as discussed herein.

Figure 3:
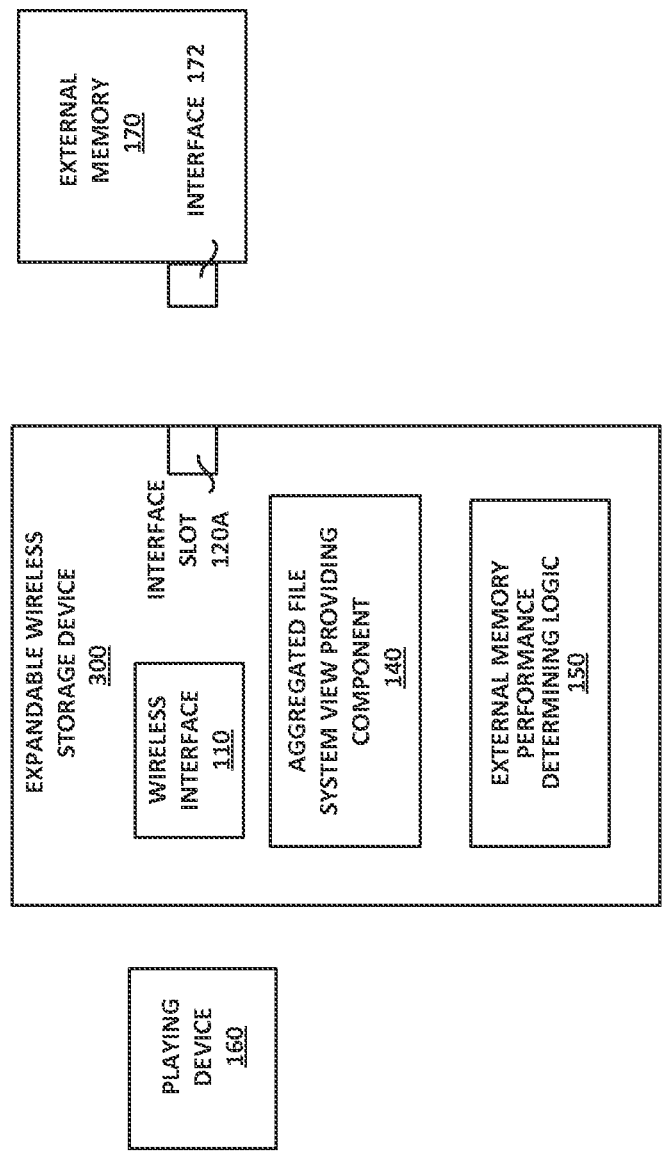
FIG. 3 depicts a block diagram of an expandable wireless storage device that does not have internal memory, according to another embodiment.

FIG. 3 depicts a block diagram of an expandable wireless storage device 300 that does not have internal memory, according to another embodiment. According to one embodiment, an expandable wireless storage device 300 does not require internal memory. For example, the expandable wireless storage device depicted in FIG. 3 does not have internal memory. However, various embodiments are well suited to an expandable wireless storage device that has internal memory as depicted in FIGS. 1 and 2. Therefore, according to various embodiments, an expandable wireless storage device may or may not have internal memory, thus, internal memory is not required. Further, an expandable wireless storage device may have internal memory but not use that internal memory, thus, internal memory is not required.

According to one embodiment, the storage device 300 may include external memory performance determining logic 150 for determining the performance of the external memory 170. For example, when the external memory 170 is physically coupled to the storage device 300 using the respective interface slot and interface, the storage device 300 can read data from the external memory 170 and calculate the external memory 170's bandwidth or transmission data rate. If the external memory 170's performance is adequate, the storage device 300 can stream a multi-media file from the external memory 170 to the playing device 160 without buffering the multi-media file in an internal buffer, such as buffer 132 depicted as a part of a storage device 100, 200. Thus, according to one embodiment, the storage device 300 is not required to have internal memory, such as internal memory 130 of storage devices 100, 200, of its own.

If the external memory 170's performance is inadequate, the storage device 300 can take one or more actions. For example, if the performance is below a certain threshold that would prevent the external memory 170 from providing adequate transmission rates, the storage device 300 can generate an error message that can be displayed, for example, on the storage device 300 or the playing device 160. In another example, if the performance is below a certain threshold, the storage device 300 may not stream any of the multi-media files from the external memory 170 or may attempt to stream a multi-media file when requested. Examples of other actions that may be taken in the event of inadequate performance are limiting the number of multi-media files that are simultaneously streamed, limiting the type of multi-media file that is streamed. More specifically, music may use less bandwidth than video and limiting the streaming to music may improve the external memory 170's performance, according to one embodiment.

Referring to FIGS. 1-3, an aggregated file system, according to one embodiment, of the multi-media files that reside on the various memories 130, 170, 180 associated with an expandable storage device 100-300 can be implemented in a number of ways. For example, the logical blocks of the storage device 100-300 can span the various memories 130, 170, 180 that the multi-media files are stored on. In another example, firmware of the storage device 100-300 can support logically storing the multi-media files on each of the various memories 130, 170, 180 and maintaining a high level representation, for example in the form of a database, that can be used to present the multi-media files stored on the various memories 130, 170, 180 as a single aggregated storage volume to a user of the storage device 100-300.

According to one embodiment, more than one type of file system may be used for the various memories 130, 170, 180 associated with a storage device 100-300. For example, the internal memory 130 may have one type of file system, a first external memory 170 may have a second type of file system and a second external memory 180 may have a third type of file system. According to one embodiment, the storage device 100-300 can provide an aggregated file system view even when more than one type of file system is associated with the same external memory 130, 170 or 180 or associated with the various memories 130, 170, 180 of the storage device 100-300.

The blocks that represent features in FIGS. 1-3 can be arranged differently than as illustrated, and can implement additional or fewer features than what are described herein. Further, the features represented by the blocks in FIGS. 1-3 can be combined in various ways. The storage devices 100-300 can be implemented using hardware, hardware and software, hardware and firmware, or a combination thereof.

Figure 4:
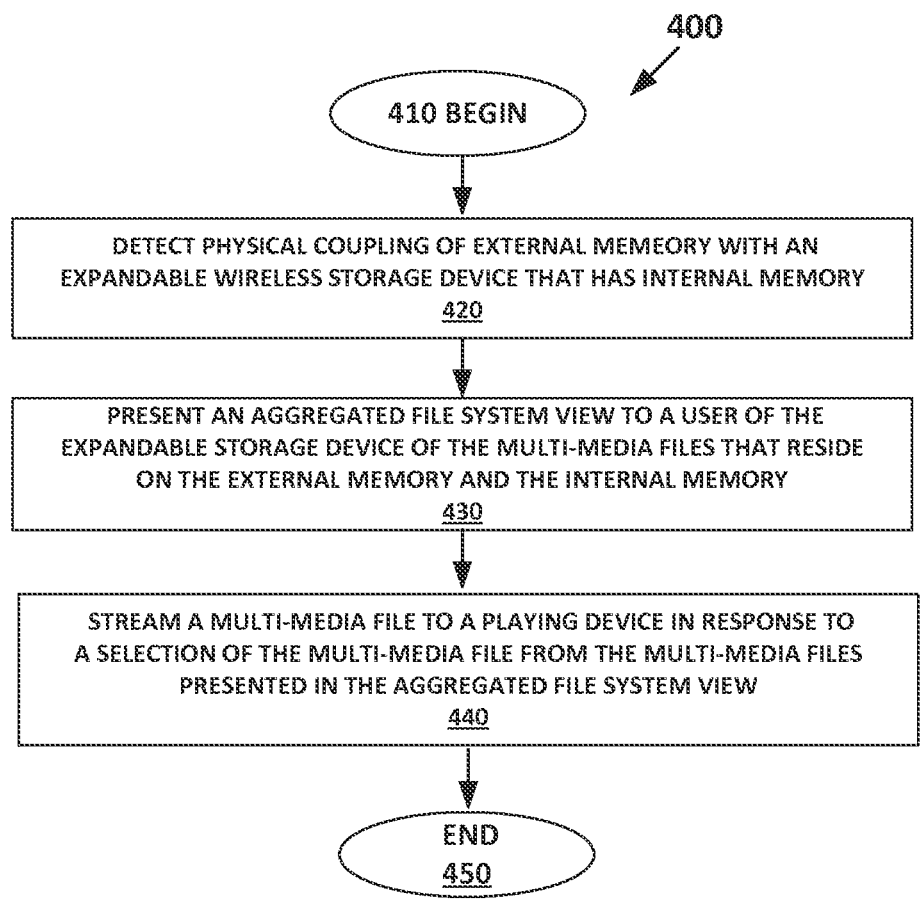
FIG. 4 depicts a flowchart of a method of streaming a multi-media file using an expandable wireless storage device, according to one embodiment.

FIG. 4 depicts a flowchart 400 of a method of streaming a multi-media file using an expandable wireless storage device, according to one embodiment.

Although specific operations are disclosed in flowchart 400, such operations are exemplary. That is, embodiments of the present disclosure are well suited to performing various other operations or variations of the operations recited in flowchart 400. It is appreciated that the operations in flowchart 400 may be performed in an order different than presented, and that not all of the operations in flowchart 400 may be performed.

The flowchart 400 shall be described in the context of the expandable wireless storage device depicted in FIG. 1.

At 410, the method begins.

At 420, the physical coupling of external memory with an expandable wireless storage device that has internal memory is detected. For example, the storage device 100 may detect that the interface 172 of an external memory 170 has been plugged into the interface slot 120 of the storage device 100.

According to one embodiment, an optional external memory performance determining logic 150 may be used to determine the performance of the external memory 170 as described herein. Although in this illustration, the determination of the external memory 170's performance is described as a part of operation 420, various embodiments are well suited for performing the determination of performance at other points in time. For example, various embodiments are well suited to performing the determination of performance as a part of 430 or 440.

At 430, an aggregated file system view is presented to a user of the expandable wireless storage device 100 of the multi-media files that reside on the external memory 170 and the internal memory 130. The aggregated file system view, according to one embodiment, presents the multi-media files that reside on the internal memory 130 and the external memory 170 as if they resided on the same memory. According to one embodiment, the aggregated file system view does not provide information pertaining to what memory any of the multi-media files reside. Thus, according to one embodiment, the user is prevented from using the aggregated file system view to determine where any of the multi-media files reside. However, the user may use other means or functions for determining where any of the multi-media files reside.

At 440, a multi-media file is streamed to a playing device 160 in response to a selection of the multi-media file from the multi-media files presented in the aggregated file system view. For example, according to one embodiment, the multi-media file is streamed wirelessly via the wireless interface 110 from the storage device 100 to the playing device 160. More specifically, if the multi-media file resides on the internal memory 130, it can be streamed from the internal memory 130 to the playing device 160. If the multi-media file resides on the external memory 170, it can be copied, in part or in its entirety, from the external memory 170 to the buffer 132 and then streamed to the playing device 160 from the buffer 132. For example, chunks of the multi-media file can be copied from the external memory 170 to the buffer 132 and the chunks can be streamed to the playing device 160. The chunks that are copied to the buffer 132 can be interleaved with the chunks that are streamed to the playing device 160. The buffer 132 can also be referred to as an "internal buffer" because it is a part of the storage device 100, according to one embodiment.

According to one embodiment, the performance of the external memory 170 is determined as described herein. If the external memory 170's performance is adequate, the storage device 100 can stream a multi-media file from the external memory 170 to the playing device 160 without buffering the multi-media file in the internal buffer 132. If the external memory 170's performance is inadequate, the storage device 100 can take one or more actions as discussed herein. For example, the storage device 100 can use the internal buffer 132 as a part of streaming a multi-media file from the external memory 170 to the playing device 160 to increase the transmission rate. Further, the storage device 100 may pre-fetch a multi-media file from the external memory 170 and store it in the internal buffer 132 in preparation for streaming the multi-media file to the playing device 160.

The decision to use the buffer 132 as a part of streaming a file from an external memory can vary from one external memory to another external memory depending on their respective performances. For example, the storage device 100 may use the internal buffer 132 as a part of streaming a file from one external memory that has inadequate performance and not use the internal buffer 132 as a part of streaming a file from another external memory that has adequate performance.

At 450, the method ends.

Various embodiments provide for notifying the user if the performance of the external memory is inadequate, using a relatively high performing buffer, such as a buffer implemented using flash memory, with a known data rate as a part of streaming to improve the performance of an external memory, verification by technical support personnel of the expandable wireless storage device by removing the external memory from the storage device and streaming a multi-media file from the internal memory to the playing device, increasing customer satisfaction by allowing the user to add external memory, reducing the cost of the storage device by enabling a reduction in the amount of internal memory, and enabling a user to organize their content by associating different types of content on different external memories that can be physically coupled to and decoupled from a storage device.

Any one or more of the embodiments described herein can be implemented using non-transitory computer readable storage medium and computer-executable instructions which reside, for example, in computer-readable storage medium of a computer system or like device. The non-transitory computer readable storage medium can be any kind of memory that instructions can be stored on. Examples of the non-transitory computer readable storage medium include but are not limited to a disk, a compact disk (CD), a digital versatile device (DVD), read only memory (ROM), flash, and so on. As described above, certain processes and operations of various embodiments of the present disclosure are realized, in one embodiment, as a series of instructions (e.g., software program) that reside within non-transitory computer readable storage memory of a computer system and are executed by the computer processor of the computer system. When executed, the instructions cause the computer system to implement the functionality of various embodiments of the present disclosure. According to one embodiment, the non-transitory computer readable storage medium is tangible.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations arid illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method of streaming a multi-media file using an expandable wireless storage device, the method comprises:
   detecting that external memory has been physically coupled with an expandable wireless storage device that has internal memory;
   presenting an aggregated file system view to a user of the expandable storage device of the multi-media files that reside on the external memory and the internal memory, wherein the aggregated file system view presents to a user the mufti-media files that reside on the internal memory and the external memory as if the multi-media files resided on the same memory; and
   streaming a multi-media file to a playing device in response to a selection of the multi-media file from the multi-media files presented in the aggregated file system view.

2. The method as recited by claim 1, wherein the multi-media file is stored on the external memory and wherein the method further comprises:
   providing a buffer that is at least a portion of the internal memory for streaming the multi-media file from the external memory to the playing device.

3. The method as recited by claim 1, wherein detecting that the external memory has been physically coupled with the expandable wireless storage device that has the internal memory further comprises:
   detecting that the external memory has been physically coupled with the expandable wireless storage device that has the internal memory, wherein the internal memory has a faster transfer rate than the external memory.

4. The method as recited by claim 1, wherein the method further comprises:
   determining whether performance of the external memory is sufficient to adequately stream a multi-media file to the playing device.

5. The method as recited by claim 4, wherein the method further comprises:
   reading data from the external memory to the expandable wireless storage device; and
   calculating a transfer rate of the read data.

6. The method as recited by claim 4, wherein the method further comprises:
   if the performance is not adequate, using an internal buffer of the expandable wireless storage device as a part of streaming the multi-media file to the playing device; and
   if the performance is adequate, streaming the multi-media file from the external memory to the playing device without using the internal buffer.

7. The method as recited by claim 1, wherein the multi-media files are stored on more than one type of file system and wherein the method further comprises:

presenting an aggregated file system view to a user of the expandable storage device of the multi-media files that reside on the more than one type of file system.

8. An expandable wireless storage device comprising:

an interface slot for physically coupling the expandable wireless storage device with external memory that is for storing a first subset of multi-media files;

internal memory for storing a second subset of the multi-media files;

a wireless interface for streaming a mufti-media file In a playing device, wherein the multi-media file is selected from a group consisting of the first subset of multi-media files stored on the external memory and the second subset of the multi-media files stored on the internal memory and wherein the internal memory is used as a buffer when the multi-media file resides on the external memory; and an aggregated file system view providing component for providing an aggregated file system view of the first subset and the second subset of the multi-media files, wherein the aggregated file system view presents to a user the multi-media files that reside on the internal memory and the external memory as if the multi-media files resided on the same memory.

9. The expandable wireless storage device of claim 8, wherein the external memory belongs to a type of memory selected from a group consisting of secure digital (SD) card, micro-SD card, universal serial bus (USB) flash drives, compact flash and secure digital high capacity (SDHC).

10. The expandable wireless storage device of claim 8, wherein the internal memory is flash memory.

11. The expandable wireless storage device of claim 8, wherein the expandable wireless storage device is a mobile device.

12. The expandable wireless storage device of claim 8, wherein the aggregated file system view is provided, at least in part, by logical blocks that span the internal memory and the external memory.

13. The expandable wireless storage device of claim 8, further comprising firmware that supports logically storing the multi-media files on each of the internal memory and the external memory and maintaining a high level representation of the multi-media files that can be used to present the internal memory and the external memory as a single aggregated storage volume to a user of the expandable wireless storage device.

* * * * *

UNITED STATES PATENT AND TRADEMARK OFFICE
CERTIFICATE OF CORRECTION

| | | |
|---|---|---|
| PATENT NO. | : 8,972,628 B2 | Page 1 of 1 |
| APPLICATION NO. | : 13/740058 | |
| DATED | : March 3, 2015 | |
| INVENTOR(S) | : David H. Hanes | |

It is certified that error appears in the above-identified patent and that said Letters Patent is hereby corrected as shown below:

In the Drawings

In sheet 4 of 4, reference numeral 420, line 1, delete "MEMEORY" and insert -- MEMORY --, therefor.

In the Claims

In column 8, line 27, in Claim 1, delete "mufti" and insert -- multi --, therefor.

In column 9, line 10, in Claim 8, delete "mufti" and insert -- multi --, therefor.

In column 9, line 10, in Claim 8, delete "In" and insert -- to --, therefor.

Signed and Sealed this
Eighth Day of September, 2015

Michelle K. Lee
*Director of the United States Patent and Trademark Office*